US009692605B2

(12) United States Patent
Lindteigen et al.

(10) Patent No.: US 9,692,605 B2
(45) Date of Patent: *Jun. 27, 2017

(54) CERTIFICATE AUTHORITY SERVER PROTECTION

(71) Applicants: Ty Lindteigen, Chandler, AZ (US); James Chester Jones, Chandler, AZ (US)

(72) Inventors: Ty Lindteigen, Chandler, AZ (US); James Chester Jones, Chandler, AZ (US)

(73) Assignee: SAIFE, Inc. AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,026

(22) Filed: Jun. 25, 2016

(65) Prior Publication Data

US 2016/0308680 A1    Oct. 20, 2016

Related U.S. Application Data

(63) Continuation of application No. 13/928,400, filed on Jun. 27, 2013, now Pat. No. 9,380,048.

(51) Int. Cl.
*H04L 29/06* (2006.01)
*H04L 9/32* (2006.01)
(Continued)

(52) U.S. Cl.
CPC .......... *H04L 9/3263* (2013.01); *H04L 9/083* (2013.01); *H04L 9/0861* (2013.01); *H04L 9/14* (2013.01);
(Continued)

(58) Field of Classification Search
CPC ..... H04L 9/3263; H04L 9/083; H04L 9/0861; H04L 9/14; H04L 9/30; H04L 63/062; H04L 63/0823
(Continued)

(56) References Cited

U.S. PATENT DOCUMENTS 7,171,565 B1 * 1/2007 Martens ............... G06Q 20/341
713/185
7,188,258 B1 * 3/2007 Aggarwal ............. H04L 9/3247
235/487
(Continued)

OTHER PUBLICATIONS

Sung, S., et al, 'Security Analysis of Mobile Authentication Using QR-Codes', CS & IT-CSCP, 2015, Samsung Electronics, entire document, http://airccj.org/CSCP/vol5/csit54712.pdf.*
(Continued)

*Primary Examiner* — Luu Pham
*Assistant Examiner* — Ronald Baum

(57) ABSTRACT

This invention includes a solution to enable a digital authentication solution comprising a network. Next, a first device is coupled to the network. The first device may include an authentication key generator that is able to generate both public and private keys in electronic formats. Next, the first device is coupled to a certificate authority gateway. The certificate authority gateway includes devices capable of converting the electronically formatted public key to a non-electronic format, and vice versa. Next, the certificate authority gateway is coupled to a certificate authority server. The certificate authority server includes devices capable of converting the electronically formatted public key to a non-electronic format, and vice versa. The certificate authority server is also contained in a secure area such as a locked room, or a safe. The secure area includes features that allow the non-electronically formatted public key to be passed across the boundary of the secure area. Finally, a second device is coupled to the network.

18 Claims, 1 Drawing Sheet

(51) Int. Cl.
*H04L 9/08* (2006.01)
*H04L 9/14* (2006.01)
*H04L 9/30* (2006.01)

(52) U.S. Cl.
CPC .............. *H04L 9/30* (2013.01); *H04L 63/062* (2013.01); *H04L 63/0823* (2013.01)

(58) Field of Classification Search
USPC ......................................................... 713/156
See application file for complete search history.

(56) References Cited

U.S. PATENT DOCUMENTS

| | | | |
|---|---|---|---|
| 2002/0029350 A1* | 3/2002 | Cooper .................. | G06Q 10/10 726/26 |
| 2005/0038754 A1* | 2/2005 | Geist ..................... | G06Q 20/042 705/64 |
| 2005/0132194 A1* | 6/2005 | Ward ..................... | G06Q 20/341 713/176 |
| 2005/0262350 A1* | 11/2005 | Boutant .............. | G06F 21/6209 713/176 |

OTHER PUBLICATIONS

Zhou, Z., et al, 'KISS: "Key it Simple and Secure" Corporate Key Management', InTRUST, 2013, entire document, http://www.netsec.ethz.ch/publications/papers/zhou_kiss_trust2013.pdf.*

* cited by examiner

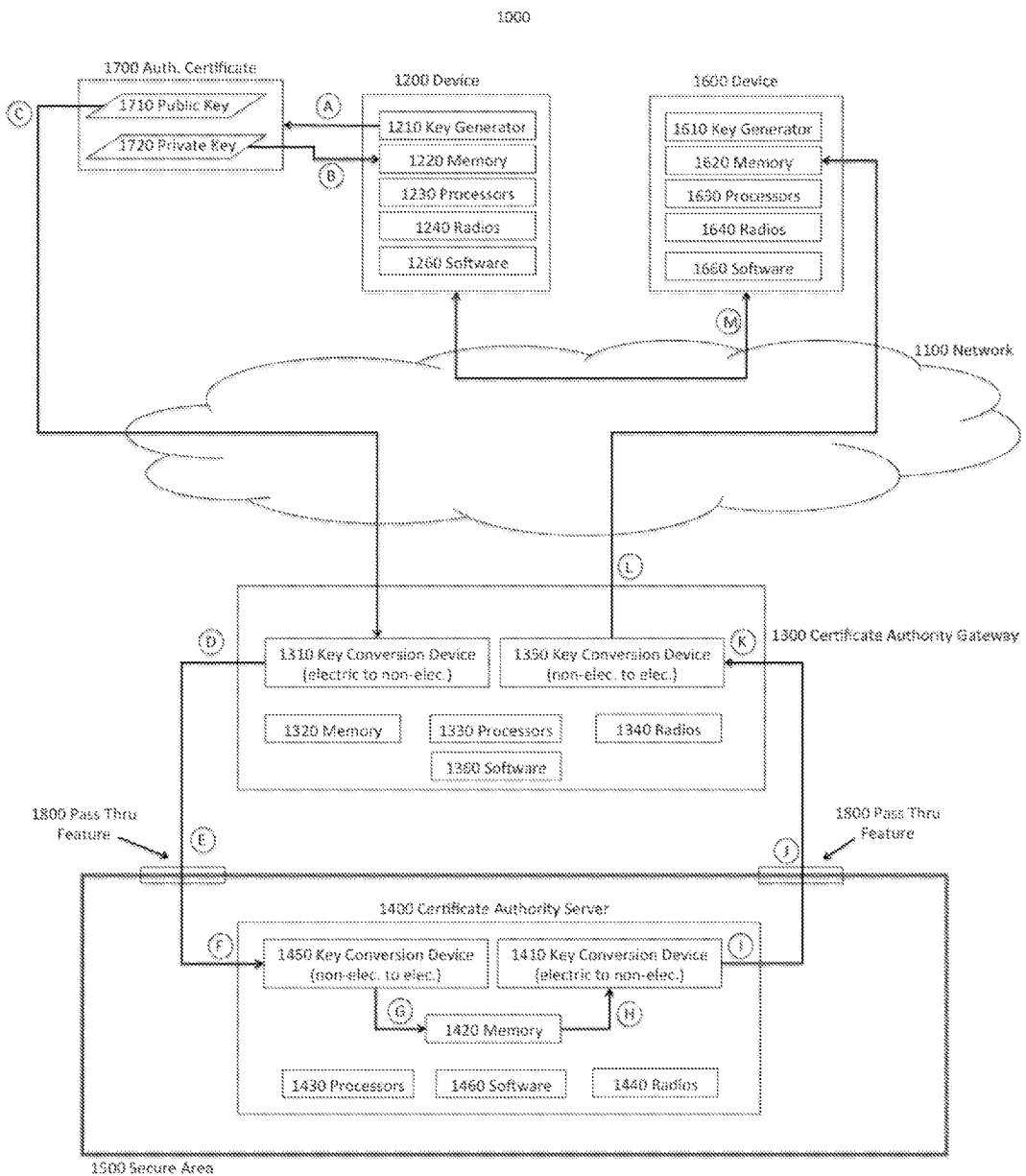

CERTIFICATE AUTHORITY SERVER PROTECTION

CROSS-REFERENCE TO RELATED APPLICATIONS

The present application is related to pending non-provisional patent application Ser. No. 13/928,400 filed Jun. 27, 2013 which claims priority to prior provisional application Ser. No. 61/713,628 filed Oct. 15, 2012 the contents of which are incorporated herein by reference.

FIELD OF THE INVENTION

This invention relates generally to the field of communications, and particularly a solution to securely authenticate devices in a network.

BACKGROUND OF THE INVENTION

Individuals, corporations, and government entities require a robust means to authenticate—identify and verify the authority—of human beings, computers, or other digital devices to access a communications or computing network. Digital certificates are often used as the means to authenticate human beings, computers, or other digital devices to access a network. For example, digital certificates are used in a number of applications that require strong authentication including online banking and high assurance communication systems.

Current authentication solutions process certificate activities, such as signing a certificate or revoking a previously signed certificate, in electronic form. Such electronic authentication solutions may include processing data packets on a network, files stored on a memory storage device—such a compact disk, or any other type of electronic format. Unfortunately these electronic authentication solutions are subject to malicious attacks that diminish the security of the certificate authority. The existing electronic authentication solutions have many other negative aspects such as their complexity, high expense, or the fact that they are always connected to the Internet. The existing electronic authentication solutions also require tight security, both physical and virtual, to protect the certificate authentication servers from malicious attacks. Thus there is a strong need for a electronic authentication solution that is more simplified, less expensive, and less vulnerable to malicious attacks when compared to existing electronic authentication solutions.

This invention provides a novel solution in which the signing certificate server is decoupled from the network. This invention enables a superior guard function that relies on manual, or automated, media conversion to process certificate activities. This invention removes all known remote attack methods while providing strong data integrity for certificate processing activities. This invention reduces the cost and complexity of physical security of the signing certificate server.

BRIEF SUMMARY OF THE INVENTION

One embodiment of the invention is a method enabling a digital authentication solution in which a device creates an authentication certificate at the edge of the network and sends the public component of the certificate to a certificate authentication server that is electronically isolated from the network. First, the device creates the authentication certificate including a public and private key both of which are in electronic formats. Next, the private key is stored in the device's secure memory and not transmitted to any other devices. Next, the public key is sent to a certificate authority system, which comprises a certificate authority gateway and certificate authority server. Next, the certificate authority gateway converts the electronically formatted public key into a non-electronic format. Next, the non-electronically formatted public key is communicated to the certificate authority server. The certificate authority server is electrically isolated from the network and stored within a secure area. Next, the certificate authority server converts the non-electronically formatted public key back to the electronically formatted public key and stores the electronically formatted public key in its memory. Next, the public key is signed by the certificate authority server. Next, the signed public key is stored in the certificate authority server's memory. Next, the signed public key is retrieved from the certificate authority server's memory. Next, the certificate authority converts the electronically formatted signed public key to a non-electronically formatted signed public key. Next, the certificate authority server communicates the non-electronically formatted signed public key out of the secure area and to the certificate authority gateway. Next, the certificate authority gateway converts the non-electronically formatted signed public key to the electronically formatted signed public key. Next, the certificate authority gateway sends the electronically formatted signed public key to the first device or alternatively to a distribution service. Next, the distribution service sends signed public keys to a second device, or the first device may directly send its signed public key to a second device. Finally, the second device may use the first device's public key, which has been signed by the certificate authority server, to establish an authenticated communicate link via the network with the first device.

Another embodiment of the invention is a system to enable a digital authentication solution comprising a network such as the internet, or a cellular 3G/4G, or any other communication network. The network comprises the devices needed to make the network secure and operational such as firewalls, routers, servers, and other computers. Next, a first device is coupled to the network. The first device includes an authentication key generator that is able to generate both public and private keys in electronic formats. The first device also includes components such as memory, processors, co-processors, and radios. Next, the first device is coupled to a certificate authority gateway. The certificate authority gateway includes a key converting device capable of converting an electronically formatted public key to a non-electronic format. In addition, the certificate authority gateway includes another key converting device capable of converting a non-electronically formatted public key back to the electronic format. The certificate authority gateway may also include components such as memory, processors, co-processors, and radios. Next, the certificate authority gateway is coupled to a certificate authority server. The certificate authority server includes a device capable of converting an electronically formatted public key to a non-electronic format. In addition, the certificate authority server includes a device capable of converting a non-electronically formatted public key back to the electronic format. The certificate authority server may also include components such as memory, processors, co-processors, and radios. The certificate authority server is also contained in a secure area such as a locked room, or a safe. The secure area includes pass thru features that allow the non-electronically formatted public key to be passed across the boundary of the secure area. For example, the safe may include clear windows that allow the non-electronically formatted pubic key to be viewed and captured by optical devices such as a scanner, monitor, or camera. Finally, a second device is coupled to the network. The second device may include an authentication key generator that is able to generate both public and private keys in electronic formats. The second device also includes components such as memory, processors, co-processors, and radios. The second device is capable of requesting the first device's signed pubic key from the certificate authority system via the network. The second device may use the first device's public key, which has been signed by the certificate authority server, to establish an authenticated communicate link via the network with the first device.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

The FIGURE is a diagram of an exemplary embodiment illustrating a digital authentication solution in which a device creates an authentication certificate at the edge of the network and sends the public key to a certificate authentication server that is electronically isolated from the network in accordance with the teachings of the present invention.

DETAILED DESCRIPTION OF THE INVENTION

The following describes the details of the invention. Although the following description will proceed with reference being made to illustrative embodiments, many alternatives, modifications, and variations thereof will be apparent to those skilled in the art. Accordingly, it is intended that the claimed subject matter be viewed broadly. Examples are provided as reference and should not be construed as limiting. The term "such as" when used should be interpreted as "such as, but not limited to."

This invention enables a novel solution for a device to create authentication certificates on the edge of the network. The device creates an authentication certificate comprising of a public and private key. The private key always stays secured with the device, thus preventing malicious hacking attacks. Only the public key is sent to a central certificate server. The certificate authority server signs the public key and distributes it to other devices on the network. The invention includes a novel solution to isolate the certificate authority server by converting the electronically formatted public key to a non-electronically formatted key that can be communicated across a secure area physically protecting the certificate authority server.

The FIGURE is a diagram of an exemplary embodiment for a system 1000 to enable a digital authentication solution comprising a network 1100. The network 1100 may be a wired or wireless communication network. The network 1100 may include a public or private network such as the Internet, intranet, telecommunications system, cellular 3G/4G, or other network capable of transmitting electronic data. The network 1100 may also be a secure network, in which a secure connection is established to allow the device to communicate with other devices privately. The network 1100 comprises the devices needed to make the network secure and operational such as firewalls, routers, servers, and other computers.

Next, a device 1200 is coupled to the network 1100. The device 1200 may include a smart phone, tablet PC, notebook PC, desktop PC, remote monitoring device, camera, sensor, remote controlled vehicle, or any other device that transmits data. The device 1200 may be used for any type of communication, computing, or electronic operation. The invention is applicable to both mobile and fixed devices since both types typically transmit data to and from each other via a network. The device 1200 also includes components such as memory 1220, processors 1230, and radios 1240. The device 1200 may also include software 1260 such as user-based application software, libraries, command line tools, virtual machines, and operating systems. The device 1200 also includes an authentication key generator 1210 that is able to generate both public keys 1710 and private keys 1729 in electronic formats.

Next, the device 1200 is coupled to a certificate authority gateway 1300. The certificate authority gateway 1300 may include a notebook PC, desktop PC, server, embedded computer, or any other device capable of processing and transmitting digital data. The certificate authority gateway 1300 also includes components such as memory 1320, processors 1330, radios 1340, and software 1360 required to enable the certificate authority gateway 1300 to function.

The certificate authority gateway 1300 includes a key conversion device 1310 capable of converting an electronically formatted public key to a non-electronic format. For example, the key conversion device 1310 may be a QR code creator in which the electronically formatted public key is converted to a QR code that is either printed on paper, or displayed on a monitor. In addition, the certificate authority gateway 1300 includes another key conversion device 1350 capable of converting a non-electronically formatted public key back to the electronic format. For example, this key conversion device may be a QR code reader that takes the QR code and converts it back to an electronic format.

Next, the certificate authority gateway 1300 is able to communicate to a certificate authority server 1400. The certificate authority server 1400 may include a notebook PC, desktop PC, server, embedded computer, or any other device capable of processing and transmitting digital data. The certificate authority server 1400 also includes components such as memory 1420, processors 1430, radios 1440, and software 1430 required to enable the certificate authority server 1400 to function. The certificate authority server 1400 includes a key conversion device 1410 capable of converting an electronically formatted public key to a non-electronic format. For example, the key conversion device 1410 may be a QR code creator in which the electronically formatted public key is converted to a QR code that is either printed on paper, or displayed on a monitor. In addition, the certificate authority server 1400 includes another key conversion device 1450 capable of converting a non-electronically formatted public key back to the electronic format. For example, this key conversion device 1450 may be a QR code reader that takes the QR code and converts it back to an electronic format.

The certificate authority server 1400 is also contained in a secure area 1500 such as a locked room, or a safe. The certificate authority server 1400 is isolated from the network in such a manner to prevent malicious attacks. This approach requires that only the certificate authority server 1400 be under lock-and-key and all other devices do not require physical protection. For example, the certificate authority server 1400 is not electronically or digitally connected to the certificate authority gateway 1300, or the network 1100. The secure area 1500 includes pass thru features 1800 that allow the non-electronically formatted public key to be communicated across the boundary of the secure area 1500. For example, when the safe area 1500 is a safe, the safe may include clear windows that allow the non-electronically formatted pubic key to be viewed and captured by optical devices such as a scanner, monitor, or camera. For example, this would enable the QR code printed on paper or displayed on a monitor to be read through the window by a QR reader within the secure area 1500.

The key conversion devices (1310, 1350, 1410, 1450) have been exemplified with a QR code converter and reader as the means to convert the public key to and from the electronic and non-electronic formats. However, other types of conversion techniques and devices could be used in this invention. For example, the electronic format could be converted to another non-electric visual media. Additional conversion media include other two-dimensional matrix barcodes, audio, gesture recognition, olfactory senses, chemical signatures, or quantum effect.

Finally, another device 1600 is coupled to the network 1100. The device 1600 may include a smart phone, tablet PC, notebook PC, desktop PC, remote monitoring device, camera, sensor, or any other device that transmits data. The device 1600 may be used for any type of communication, computing, or electronic operation. The device 1600 also includes components such as memory 1620, processors 1630, and radios 1640. The device 1600 may also include software 1660 such as user-based application software, libraries, command line tools, virtual machines, and operating systems. The device 1600 may also include an authentication key generator 1610 that is able to generate both public and private keys in electronic formats.

The other device 1600 is capable of requesting the first device's 1200 signed pubic key from the certificate authority gateway 1300 and certificate authority server 1400 via the network 1100. The second device 1600 may use the first device's 1200 public key, which has been signed by the certificate authority server 1400, to establish an authenticated communicate link via the network 1100 with the first device 1200.

Another embodiment of the invention is a method enabling a digital authentication solution in which a device 1200 creates an authentication certificate 1700 at the edge of the network 1100 and sends the public key 1710 to a certificate authentication server 1400 that is electronically isolated and protected from the network 1100. First, referring to the FIGURE (A), the device 1200 creates the authentication certificate 1700 including a public key 1710 and private key 1720 both of which are in electronic formats.

Next, referring to the FIGURE (B), the private key 1710 is stored in the device's memory 1220 and not transmitted to any other devices. The device's memory 1220 may include volatile and non-volatile memory such as flash, cache, RAM, ROM, solid state drives, hard disk drives, or secondary memory such as tape, magnetic disks and optical discs. Ideally, the private key 1710 would be stored in persistent memory so that the data is not lost when the device 1200 is powered off.

Next, referring to the FIGURE (C), the public key 1710 is sent to a certificate authority system, which comprises a certificate authority gateway 1300 and a certificate authority server 1400. The public key 1710 is still in an electronic format and can be sent to the certificate authority gateway 1300 via the network 1100 either wired or wirelessly. The wireless communication is facilitated by the device's 1200 radios 1240 and the certificate authority gateway's 1350 radios 1340.

Next, referring to the FIGURE (D), the certificate authority gateway 1300 uses a key conversion device 1310 to convert the electronically formatted public key into a non-electronic format. The electronically formatted public key is converted to some other non-electronic data format that is reversible. For example, the key conversion device 1310 may be a QR code creator in which the electronically formatted public key is converted to a QR code that is either printed on paper, or displayed on a monitor.

Next, referring to the FIGURE (E), the non-electronically formatted public key is communicated to the certificate authority server 1400. The certificate authority server 1400 is electrically isolated from the network 1100 and stored within a secure area 1500 such as a locked room, or a safe. The secure area 1500 includes pass thru features 1800 that allow the non-electronically formatted public key to be communicated across the boundary of the secure area 1500. For example, when the safe area 1500 is a safe, the safe may include clear windows that allow the non-electronically formatted pubic key to be viewed and captured by optical devices such as an image sensor, scanner, monitor, or camera.

Next, referring to the FIGURE (F), the certificate authority server 1400 converts the non-electronically formatted public key back to the electronically formatted public key. For example, the QR code could be printed on paper or displayed on a monitor outside of the secure area 1500 and read through the pass thru feature 1800 (i.e. window) by a key conversion device 1450 (i.e. QR reader) and converted back to an electronic format.

Next, referring to the FIGURE (G), the electronically formatted public key is stored in its memory 1420. The memory 1420 may include volatile and non-volatile memory such as flash, cache, RAM, ROM, solid state drives, hard disk drives, or secondary memory such as tape, magnetic disks and optical discs. Ideally, the electronically formatted public key would be stored in persistent memory so that the data is not lost if the certificate authority server 1400 is powered off. Next, the public key is signed by the certificate authority server. Next, the signed public key is stored in the certificate authority server's memory.

Next, referring to the FIGURE (H), when the key is requested from the requesting device (i.e. 1200) and, or to the distribution service 1900, the certificate authority server 1400 retrieves the electronically formatted signed public key from its memory 1420.

Next, referring to the FIGURE (I), the certificate authority server 1400 uses a key conversion device 1410 to convert the electronically signed formatted public key into a non-electronic format. The electronically formatted signed public key is converted to some other non-electronic data format that is reversible. For example, the key conversion device 1410 may be a QR code creator in which the electronically formatted signed public key is converted to a QR code that is either printed on paper, or displayed on a monitor.

Next, referring to the FIGURE (J), the certificate authority server communicates the non-electronically formatted signed public key out of the secure area and to the certificate authority gateway. For example, the QR code could be printed on paper or displayed on a monitor inside the secure area 1500 and read through the pass thru feature 1800 (i.e. window) by a key conversion device 1350 (i.e. QR reader). Next, referring to the FIGURE (K), the certificate authority gateway converts the non-electronically formatted signed public key to the electronically formatted signed public key. For example, a QR code reader could read the printed or displayed QR code inside the secure area 1500 via the pass thru feature 1800 (i.e. window) and convert the non-electronically formatted signed public key back to an electronic format.

Next, referring to the FIGURE (L), the certificate authority gateway 1300 sends the electronically formatted signed public key to the first device 1200 or alternatively to a distribution service 1900—referring to the FIGURE (L'). Next, the distribution service 1900 sends signed public key to the second device 1600, or the first device 1200 may directly send its signed public key to the second device 1600. The electronically formatted signed public key is again in an electronic format and can be sent to the device 1600 and, or to the distribution service 1900 via the network 1100 either by wired or wireless connection. The wireless communication is facilitated by the device's 1600 radios 1640 and the certificate authority gateway's 1300 radios 1340.

Finally, referring to the FIGURE (M), the second device 1600 may use the first device's public key 1710, which has been signed and verified by the certificate authority server 1400, to establish an authenticated communicate link via the network 1100 with the first device 1200. The first device 1200 will recognize its public key and thus know that the second device 1600 is a trusted device. Hence, the two devices will be able to communicate with each other with confidence that the devices are mutually trustworthy.

Throughout this description, references were made to components of the system coupled together in a manner that allows the exchange and interaction of data, such that the operations and processes described may be carried out. For example, the components may be coupled with electrical circuitry, or through wireless networks that allow the devices to transfer data, receive power, execute the operations described, and provide structural integrity. The invention may also be enabled with more components than described in the specification. For example, any number and combination of devices, networks, certificate authentication gateways, certificate authentication servers, and key conversion devices may be utilized to enable and scale out this invention.

The terms and expressions, which have been employed herein, are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method enabling communication over a network comprising:
    sending by a first computer device an electronically formatted public key to a first server;
    converting by the first server the electronically formatted public key into a non-electronically formatted public key;
    communicating by the first server the non-electronically formatted public key to a second server, wherein the second server is electrically and physically isolated from the first server via a boundary of a secure area and said communication is via a non-electrical communication format to prevent an electronic attack on the second server;
    converting by the second server the non-electronically formatted public key back to the electronically formatted public key;
    signing by the second server the electronically formatted public key as originating from the first computer device to produce a signed electronically formatted public key;
    converting by the second server the signed electronically formatted public key to a signed non-electronically formatted public key;
    communicating by the second server the signed non-electronically formatted public key to the first server, wherein said communication is via a non-electrical communication format to prevent an electronic attack on the second server;
    converting by the first server the signed non-electronically formatted public key to the signed electronically formatted public key;
    sending by the first server the signed electronically formatted public key to a second computer device;
    sending by the second computer device the signed electronically formatted public key to a third computer device; and
    establishing by the third computer device, using the signed electronically formatted public key, a signed communication link with the first computing device.

2. The method of claim 1 wherein the non-electronically formatted public key is a QR code displayed on a physical medium including printed on a paper or displayed on a monitor.

3. The method of claim 1 wherein the second server is stored in a secure area configured with a pass thru feature that allows the non-electronically formatted public key to be communicated across a boundary of the secure area.

4. The method of claim 1 wherein the second server is stored in the secure area configured within a physically isolated area including a locked room or a safe.

5. The method of claim 4 wherein the second server is stored in the secure area configured with a clear window that allows the non-electronically formatted public key to communicate across the boundary of the secure area via a non-electrical communication format including to be viewed and captured by an optical device.

6. The method of claim 1 wherein the network is a wireless network.

7. The method of claim 1 wherein the second server comprises memory, processors, radios, and software including a user-based application software, a library file, a command line tool, a virtual machine, and an operating system.

8. The method of claim 1 wherein the first server and the second server each includes a key conversion logic configured to convert an electronically formatted public key to a non-electronically formatted public key and to convert the non-electronically formatted data set back to the electronically formatted public key.

9. The method of claim 8 wherein the key conversion logic comprises a QR code writer-reader in which the electronically formatted public key is converted to a QR code that is written on a paper or displayed on a monitor and a QR code reader that takes the QR code and converts the QR code back to an electronically format public key.

10. The method of claim 1 wherein a format of the non-electronically formatted public key comprises at least one of a multi-dimensional matrix barcode, an acoustic signal, a physical motion, an olfactory sense, a chemical signature, or a quantum effect.

11. A system of servers configured to enable secure communication across a network comprising:
    a first server electrically and physically isolated from a second server by a secure boundary;

the first server configured to receive an electronically formatted public key from a first device;

the first server configured to convert the electronically formatted public key to a non-electronically formatted public key;

the first server configured to communicate the non-electronically formatted public key to the second server;

the second server configured to convert the non-electronically formatted public key back to the electronically formatted public key and sign the electronically formatted public key as originating from the first device yielding a signed electronically formatted public key;

the second server configured to convert the signed electronically formatted public key to a signed non-electronically formatted public key;

the second server configured to communicate the signed non-electronically formatted public key to the first server;

the first server configured to convert the signed non-electronically formatted public key to the signed electronically formatted public key; and the first server configured to send the signed electronically formatted public key to a second device.

12. The system of claim 11 wherein the first server and the second server each include a key conversion logic configured to convert an electronically formatted public key to a non-electronically formatted public key and convert a non-electronically formatted public key to an electronically formatted public key.

13. The system of claim 11 wherein the second device is a distribution service.

14. The system of claim 13 wherein the distribution service sends the signed electronically formatted public key to a third device enabling the third device to establish a secure and signed communication link with the first device.

15. The system of claim 13 wherein the first server is configured to send the signed electronically formatted public key directly to the first device enabling the first device to send the signed electronically formatted public key directly to the second device, bypassing the distribution service.

16. A system configured to enable signed communication over a network comprising:

a first computer device including an electronically formatted public key;

the first computer device configured to send the electronically formatted public key to a first server;

the first server configured to convert the electronically formatted public key into a non-electronically formatted public key;

the first server configured to communicate the non-electronically formatted public key to a second server, wherein the second server is electrically and physically isolated from the first server via a boundary of a secure area and said communication is via a non-electrical communication format to prevent an electronic attack on the second server;

the second server configured to convert the non-electronically formatted public key back to the electronically formatted public key;

the second server configured to sign the electronically formatted public key as originating from the first computer device to produce a signed electronically formatted public key;

the second server configured to convert the signed electronically formatted public key to a signed non-electronically formatted public key;

the second server configured to communicate the signed non-electronically formatted public key to the first server, wherein said communication is via a non-electrical communication format to prevent an electronic attack on the second server;

the first server configured to convert the signed non-electronically formatted public key to the signed electronically formatted public key;

the first server configured to send the signed electronically formatted public key to a second computer device;

the second computer device configured to send the signed electronically formatted public key to a third computer device; and the third computer device configured to use the signed electronically formatted public key to establish a signed communication link via the network with the first computer device.

17. the system of claim 16 wherein the first server and second server each includes a key conversion logic configured to convert an electronically formatted public key to a non-electronically formatted public key and convert the non-electronically formatted public key back to the electronically formatted public key.

18. The system of claim 16 wherein the third computer device is a distribution service that sends the signed electronically formatted public key to a fourth computer device enabling the fourth computer device to establish a secure and signed communication link with the first computer device.

* * * * *